Aug. 10, 1954  A. J. MORSCHEL  2,685,797
MAGNETIC LIQUID LEVEL TANK GAUGE
Filed April 9, 1951  2 Sheets-Sheet 1

INVENTOR.
Albert J. Morschel,
BY Victor J. Evans & Co.
ATTORNEYS

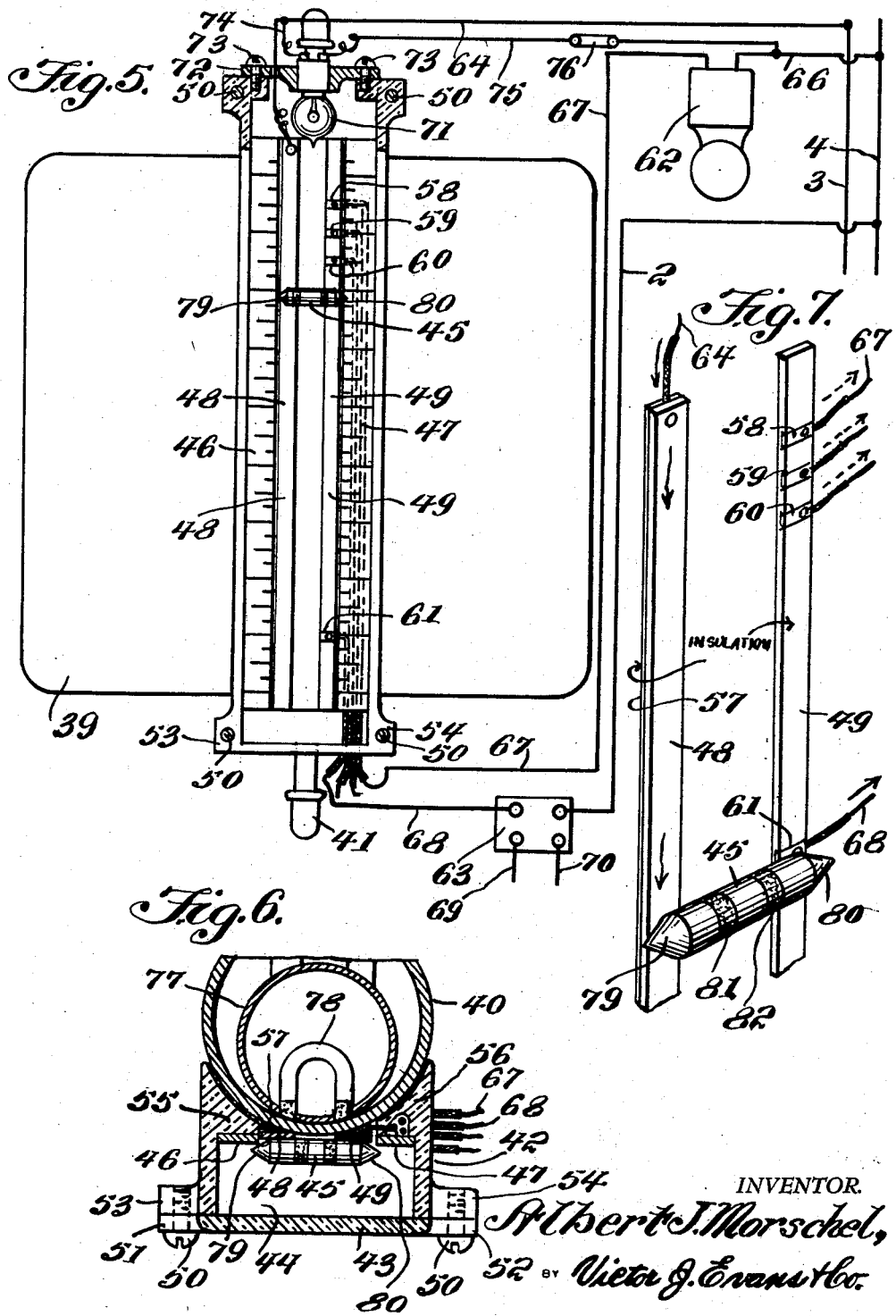

Patented Aug. 10, 1954

2,685,797

UNITED STATES PATENT OFFICE 2,685,797

MAGNETIC LIQUID LEVEL TANK GAUGE

Albert J. Morschel, Yonkers, N. Y., assignor to Liquidivision Gauge and Control Corp., a domestic corporation of New York Application April 9, 1951, Serial No. 220,046

8 Claims. (Cl. 73—319)

This invention relates to gauges for indicating the level of liquid in a closed tank such as fuel oil tanks and other containers used for oil, and also liquified gases, such as carbon dioxide, propane, and butane, and it may be used on vented tanks, or tanks under pressure or tanks that operate under vacuum.

The tank gauge of this invention is particularly adapted for use on solvents and other similar liquids that are not viscous.

In particular this invention includes a column spaced from the tank and having connections from the upper and lower ends of the column to upper and lower parts of the tank, respectively, and a float, having a magnet therein vertically slidable in the column and positioned whereby the magnet holds a roller in suspension in a scale compartment of the column whereby the roller coacts with scales in the compartment to accurately indicate the level of liquid in the tank.

The purpose of this invention is to provide means for transmitting the position of a float to an indicating roller on the outer surface of a sealed column whereby the level of liquid in a tank is indicated without opening the tank.

In the conventional fuel oil tank as used universally for domestic oil burners it is necessary, to obtain a direct or positive reading of the amount of oil in the tank to remove a cap or plug and drop a stick into the tank. This method of obtaining a reading showing the amount of oil in the tank is objectionable because the stick, not only drops oil on the floor, but permits oil fumes to escape that infiltrates throughout a building in which the tank is positioned. With this thought in mind this invention contemplates a method of mounting a float whereby a magnet therein influences a roller or indicator on the outer surface of the wall of a well in which the float is positioned and with the upper and lower ends of the well connected to upper and lower parts of the tank, respectively the float will follow the liquid level of the tank.

The object of this invention is, therefore, to provide means for mounting a float having a magnet therein whereby the float travels vertically with the liquid level of liquid in a tank and wherein the magnet influences a roller that coacts with scales which indicate the level and also the amount of liquid in the tank.

Another object of the invention is to provide a liquid level indicator wherein a float in a vertically disposed tubular column, the ends of which are connected to a tank, carries a roller over scales without a connection between the float and roller.

A further object of the invention is to provide an improved correct reading tank gauge having a float with a magnet therein in a column spaced from the tank with a roller influenced by the magnet in the float, and having means for facilitating the travel of the float, which is of a simple and economical construction.

With these and other objects and advantages in view the invention embodies a substantially cylindrical column having a scale compartment with scales therein on the outer face with a float having positioning rollers thereon positioned in the column, a roller on the outer surface of the column positioned to be influenced by a magnet in the float, and suitable connections between the upper end of the column and upper part of the tank and lower part of the column with the lower part of the tank.

Other features and advantages of the invention will appear from the following description taken in connection with the drawings wherein:

Figure 5 is an end elevational view, similar to Figure 3, showing a modification wherein the device is used on a square tank and a signal is provided for indicating the approach of the float and roller to the upper and lower ends of the tank and the scale compartment is provided with a light for showing the position of the roller.

Figure 6 is a sectional plan on an enlarged scale through the column showing the device as illustrated in Figure 5 with part of the column broken away.

Figure 7 is a detail illustrating contact or bus bars used in combination with the scales in the scale compartment of the device shown in Figures 5 and 6.

Figures 1, 2, 3, 4:
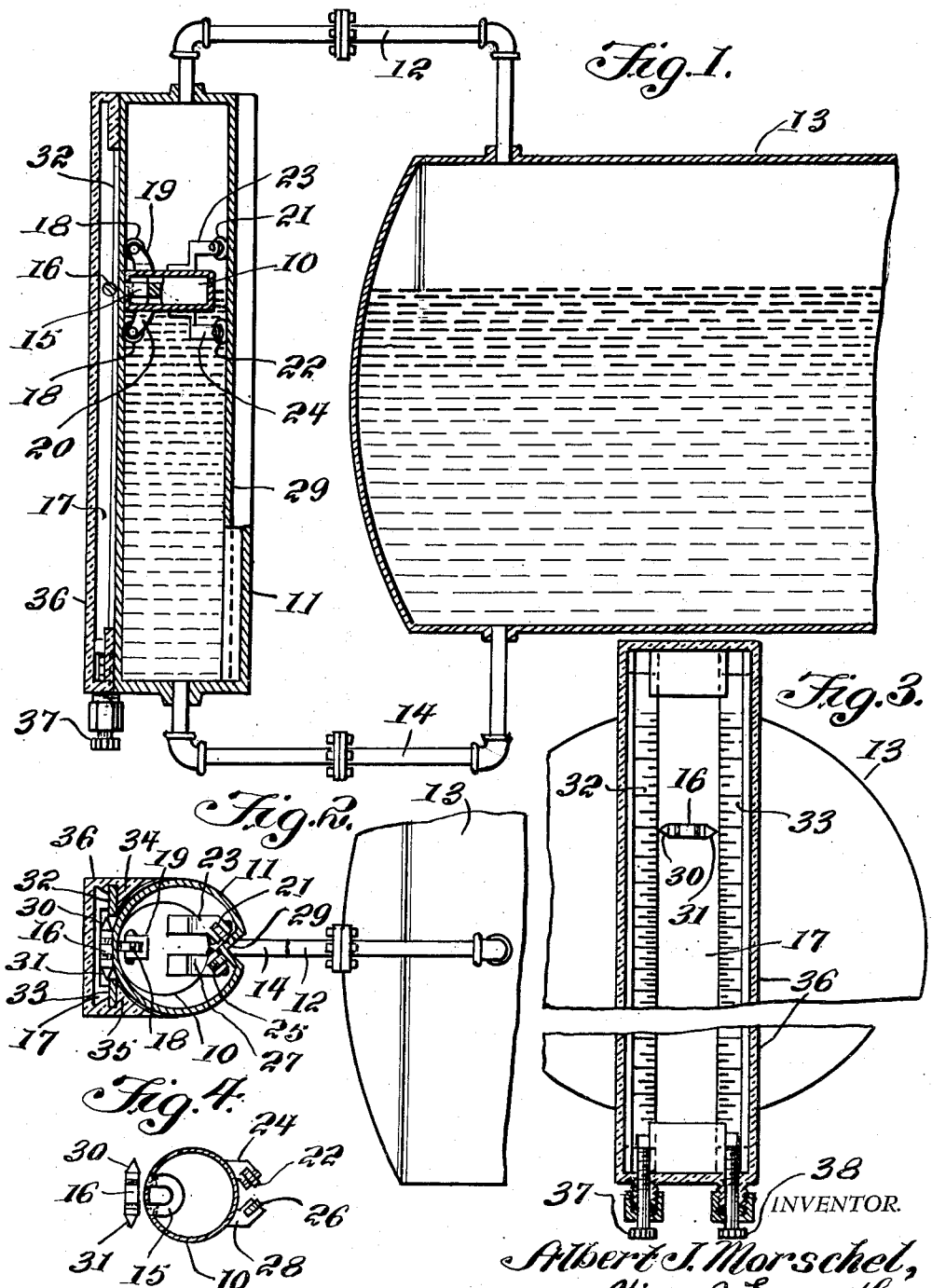
Figure 1 is a vertical section through one end of a tank showing a float column extended beyond one end thereof and connected to upper and lower parts of the tank with pipe sections.
Figure 2 is a sectional plan showing a pipe extended from the upper part of a tank through a column with parts of the upper end of the column broken away and shown in section.
Figure 3 is a front elevational view showing the graduated scales on the face of the column and with the scale housing broken away.
Figure 4 is a sectional plan showing the float with the wall of the column omitted.

Referring now to the drawings wherein like reference characters denote corresponding parts the improved direct reading liquid level tank indicator of this invention includes a float housing 10 in a column 11 with the upper end of the column connected by a pipe 12 to a tank 13, with the lower end connected by a pipe 14 to the lower part of the tank, and with the float provided with a magnet 15 that actuates a roller 16 in a sealed scale compartment 17 on the face of the column 11.

The float housing 10 shown in Figure 1 is retained in rolling contact with the inner surface of the column 11 by rollers 18 in spring supported bearings 19 and 20 on the side in which the magnet 15 is positioned, and rollers 21 and 22 in spring supporting bearings 23 and 24 on one side, and rollers 25 and 26 in bearings 27 and 28 on the other, positioned at the opposite side of the float and mounted with the rollers in engagement with surfaces of a V-shaped rib 29 on the inner surface of the wall of the column. By this means the float is freely mounted and at the same time the position of the magnet 15 therein remains whereby the magnet influences attracts and positions the roller 16 on the outer face of the column.

The roller 16 as shown in Figures 1, 2 and 3 is provided with conical shaped ends 30 and 31 and the points at the ends are positioned to register with graduations on scales 32 and 33, respectively, as illustrated in Figure 3.

The scales as shown in Figure 3 are slidably mounted against the surfaces 34 and 35, respectively of the housing 36 in which the scale compartment 17 is positioned and each scale is provided with an adjusting screw, as indicated by the numerals 37 and 38, the screws having smooth portions that pass through a stuffing gland on the lower end of the housing and are positioned to contact the lower ends of the scales for adjusting the scales in a vertical plane.

Pipes 12 and 14 connect the upper and lower ends of the column 11 to corresponding parts of the tank 13 in any suitable manner.

In the design illustrated in Figures 5, 6 and 7 wherein the liquid level gauge is used on a square tank 39, a column 40, which is connecetd to the upper and lower ends of the tank by connections 41, similar to the connections 12 and 14, is provided with a housing 42 with a removable face plate 43 providing a scale compartment 44 in which a roller 45, similar to the roller or pointer 16, is positioned and the roller coacts with scales 46 and 47, a non-magnetic metal contact strip or bus bar 48, and non-magnetic metal contacts on a thin bar 49 which is made of insulated and non-magnetic material.

The face plate 43 is secured to the housing 42 by screws 50, the screws extending through lugs 51 and 52 on the face plate and threaded into lugs 53 and 54, respectively on the sides of the housing.

The scales 46 and 47 are positioned against surfaces 55 and 56 of the housing and the bar 48 is insulated from the housing and column by an insulating strip 57.

The bar 49 which is very thin to cut down magnetic reluctance, to facilitate the response of the roller to the magnet is provided with spaced non-magnetic contacts 58, 59, 60, and 61 which are positioned to be engaged by the contact roller 45.

By this means circuits may be completed through the bar 48 and contacts on the bar 49 to actuate a signal such as ringing a bell 62 when the roller reaches the upper end of the tank, or to actuate a cut-off switch 63 when the roller reaches the lower end of the tank.

Adjustment screws similar to the adjustment screws 37 and 38 may be used in the design shown in Figure 5 and these will pass though stuffing boxes and control and position the scales 46 and 47. The compartment 44 shall be gas tight so as to hold an inert gas. The function of this gas is to eliminate clouding or sweating of the transparent cover 43. Another function of this gas is to eliminate burning or oxidizing of the roller 45, the bar 48 and contact points 58, 59 and 60. A transparent gas tight compartment or bulkhead shall isolate the lamp 71 from the main compartment 44.

The roller can actuate any combination of audible or visible alarm circuits or controls through relays if necessary at any point along the path of travel of the roller as indicated by the contacts 58, 59 and 60.

Any number of contact points similar to 58 and 59 and 60 may be mounted along any part of the insulated non-magnetic strip 49 for signal or control circuits.

As illustrated in Figure 5 the bar 48 is connected by a wire 64 to a source of electric current and the source of current is connected by a wire 66 to the opposite terminal of the bell which is connected by a wire 67 to the bar 58.

A terminal 61 on the lower part of the bar 49 is connected to one terminal of the cut-off switch 63 by a wire 68 with the other terminal of the switch connected by a wire 69 to a pump, or the like, the opposite terminal of which is connected to the switch by a wire 70. The opposite terminal of the switch is connected to the source of current by a wire 2, the source of current being supplied by wires 3 and 4. With the parts connected in this manner circuits are completed through the signal or cut-off switch as the roller 45 completes the circuit through the bar 48 and contacts of the bar 49 with one end of the roller contacting the bar 48 and the other engaging the contacts on the bar 49. The contacts on the bar 49 are positioned to correspond with the desired liquid level in the tank and an alarm sounded or a signal light cut in as the roller approaches the upper end of the tank, and a switch actuated to start a pump as the roller approaches the lower end of the tank.

The gauge may be provided with a light 71 which is carried by a cap 72 secured to the upper end of the housing by screws 73 and, as illustrated in Figure 5 one terminal of the light may be connected by a wire 74 to the source of current through the wire 64 and the other by a wire 75 to the source of current through the wire 66. The wire 75 may be provided with a light switch 76 so that the light may be turned on or off as may be desired.

In this design the column 40 is provided with a float 77 corresponding to the float 10 and the float is provided with a magnet 78 and suitable guide rollers similar to the rollers 18, Figure 1 on one side and 21 and 22, and 25 and 26 on the other.

The roller 45 may also be provided with conical shaped ends 79 and 80 and spaced annular recesses in the roller may be colored or provided with luminous bands 81 and 82.

With the graduations on the scales indicating gallons or quantities of oil or other liquid in the tank the graduations are comparatively close at the center, as shown in Figure 3 when the gauge is used on or in combination with round tanks, whereas with the gauge used in combination with square tanks the graduations are equally spaced throughout the lengths of the scales.

With the parts arranged in this manner the liquid level in the column is the same as that in the tank and with the float following the liquid level and actuating the roller with the magnet the roller or pointer will indicate the level of liquid in the tank whereby the elevation of the liquid and also the quantity of liquid in the tank may be accurately indicated without providing an opening in the tank.

The columns 11 and 40 and also the housings 36 and 42 are formed of non-magnetic material and it will be understood that the columns may be of any suitable shape in cross section.

The metal contact strip or bar 48, the insulated strip 49, the metal contacts 58, 59, 60 and 61 are of non-magnetic material. The roller 45 is made of steel or iron or other magnetic material.

It will be understood that other modifications may be made in the design and arrangement of the parts without departing from the spirit of the invention.

What is claimed is:

1. A liquid level indicator comprising a tank, a column having a sealed compartment on the face thereof and a vertically disposed rib extended inwardly from the wall, connections from the upper and lower ends of the column to upper and lower parts of the tank whereby the liquid level in the column is equivalent to that of the tank, a float positioned in the column, arms having rollers journaled in the ends extended from said float and positioned to engage the inner surface of the column, two of said rollers being positioned to engage opposite surfaces of said rib, a magnet in the float, a scale on the outer surface of the column and a roller with tapered ends suspended against the outer surface of the column by the magnet in the float and positioned to coact with the scale to indicate the level of liquid in the tank.

2. A liquid level indicator comprising a tank, a column having a V-shaped rib extended inwardly from the wall thereof and positioned longitudinally therein, connections from the upper and lower ends of the column to upper and lower parts of the tank whereby the liquid level in the column is equivalent to that of the tank, a float positioned in the column, arms having rollers journaled in the ends extended from said float and positioned to engage the inner surface of the column, two of said rollers being positioned to engage opposite surfaces of said rib, a housing having a scale compartment therein positioned on the face of the column, a scale positioned in the scale compartment, and a roller suspended in the scale compartment and positioned to coact with the scale whereby with the roller influenced by the magnet of the float the level of liquid in the tank is indicated on the scale.

3. A liquid level indicator comprising a tank, a column having a sealed compartment on the face thereof and a vertically disposed rib extended inwardly from the wall, connections from the upper and lower ends of the column to upper and lower parts of the tank whereby the liquid level in the column is equivalent to that of the tank, a float positioned in the column, arms having rollers journaled in the ends extended from said float and positioned to engage the inner surface of the column, two of said rollers being positioned to engage opposite surfaces of said rib, a magnet in the float, means for preventing turning of the float laterally in the column, a scale on the outer surface of the column, and a roller suspended against the outer surface of the column by the magnet in the float and positioned to coact with the scale to indicate the level of liquid in the tank.

4. In a liquid level indicator, the combination which comprises a tank, a column having a vertically disposed V-shaped rib on the inner surface, connections from the upper and lower ends of the column to upper and lower parts of the tank whereby the liquid level in the column is the same as that of the tank, a float positioned in the column, arms having rollers journaled in the ends extended from said float and positioned to engage the inner surface of the column, two of said rollers being positioned to engage opposite surfaces of said rib, a magnet carried by the float, a gas tight housing having a scale compartment therein positioned on the column, scales positioned in said scale compartment, and a roller suspended in the scale compartment by the magnet in the float and positioned to coact with the scales to indicate the level of liquid in the tank.

5. In a liquid level indicator, the combination which comprises a tank, a column having a vertically disposed V-shaped rib on the inner surface, connections from the upper and lower ends of the column to upper and lower parts of the tank whereby the liquid level in the column is the same as that of the tank, a float positioned in the column, arms having rollers journaled in the ends extended from said float and positioned to engage the inner surface of the column, two of said rollers being positioned to engage opposite surfaces of said rib, a magnet carried by the float, a gas tight housing having a scale compartment therein positioned on the column, scales positioned in said scale compartment, means adjusting the scales, and a roller suspended in the scale compartment by the magnet in the float and positioned to coact with the scales to indicate the level of liquid in the tank.

6. In a liquid level indicator, the combination which comprises a tank, a column having a vertically disposed V-shaped rib on the inner surface, connections from the upper and lower ends of the column to upper and lower parts of the tank whereby the liquid level in the column is the same as that of the tank, a float positioned in the column, a magnet carried by the float, a housing having a scale compartment therein positioned on the column, scales positioned in said scale compartment, means adjusting the scales, a roller suspended in the scale compartment by the magnet in the float and positioned to coact with the scales to indicate the level of liquid in the tank, and arms with rollers journaled in the ends extended from the float and positioned to engage opposite surfaces of the rib retaining the float in position with the magnet positioned to retain the roller in combination with the scales.

7. In a liquid level indicator, the combination which comprises a tank, a column having a vertically disposed V-shaped rib on the inner surface, connections from the upper and lower ends of the column to upper and lower parts of the tank whereby the liquid level in the column is the same as that of the tank, a float positioned in the column, a magnet carried by the float, a housing having a scale compartment therein positioned on the column, scales positioned in said scale compartment, means adjusting the scales, a roller suspended in the scale compartment by the magnet in the float and positioned to coact with the scales to indicate the level of liquid in the tank, arms with rollers journaled in the ends extended from the float and positioned to engage opposite surfaces of the rib retaining the float in position with the magnet positioned to retain the roller in combination with the scales, spaced contact bars positioned in the scale compartment, and means whereby the roller completes a circuit through the bars as the liquid level in the tank reaches a predetermined point.

8. In a liquid level indicator, the combination which comprises a tank, a column having a vertically disposed V-shaped rib on the inner surface, connections from the upper and lower ends of the column to upper and lower parts of the tank whereby the liquid level in the column is the same as that of the tank, a float positioned in the column, a magnet carried by the float, a housing carried by the float, a gas tight housing filled with an inert gas, having a scale compartment therein positioned on the column, scales positioned in said scale compartment, means for adjusting the scales, a roller suspended in the scale compartment by the magnet in the float and positioned to coact with the scales to indicate the level of liquid in the tank, arms with rollers journaled in the ends extended from the float and positioned to engage opposite surfaces of the rib for retaining the float in position with the magnet positioned to retain the roller in combination with the scales, contact bars in the scale housing positioned to coact with the roller, and means adjustably mounted on the contact bars whereby the roller completes a circuit through the bars when the liquid level reaches a predetermined high position or a predetermined low position in the tank.

References Cited in the file of this patent

UNITED STATES PATENTS

| Number | Name | Date |
|---|---|---|
| 995,414 | Nault | June 13, 1911 |
| 1,185,144 | Stukel | May 30, 1916 |
| 1,227,286 | Maher | May 22, 1917 |
| 2,233,572 | Atkins | Mar. 4, 1941 |
| 2,427,627 | Shiroyan | Sept. 16, 1947 |
| 2,556,346 | Stromberg | June 12, 1951 |